United States Patent [19]
Fabris et al.

[11] Patent Number: 5,116,449
[45] Date of Patent: May 26, 1992

[54] GROOVED DRUM FOR TIRE BUILDING MACHINE

[75] Inventors: Arnold J. Fabris, Warren; Valdis L. Pareizs, Detroit; Leonard S. Stokes, Mt. Clemens, all of Mich.

[73] Assignee: The Uniroyal Goodrich Tire Company, Akron, Ohio

[21] Appl. No.: 577,358

[22] Filed: Sep. 4, 1990

[51] Int. Cl.$^5$ .............................................. B29D 30/24
[52] U.S. Cl. ................................. 156/415; 156/417; 156/123; 152/502; 152/503
[58] Field of Search ............... 156/121, 123, 400, 401, 156/403, 408, 414, 415, 418, 420, 417, 419; 152/502, 503

[56] References Cited

U.S. PATENT DOCUMENTS

| | | | |
|---|---|---|---|
| 3,489,634 | 1/1970 | Pizzo et al. | 156/415 |
| 3,813,271 | 5/1974 | Riggs | 156/414 |
| 4,072,550 | 2/1978 | Stalter, Jr. | 156/121 |
| 4,263,083 | 4/1981 | Schleiger | 156/414 |

Primary Examiner—Geoffrey L. Knable
Assistant Examiner—Francis J. Lorin
Attorney, Agent, or Firm—Alfred D. Lobo; Alan A. Csontos

[57] ABSTRACT

An apparatus for building a tire having an inner liner to which a sealant strip is to be laminated, comprises a rotary drum having a surface in which a trough or "groove" is provided. The depth of the groove corresponds approximately to the thickness of a layer of an elastomeric sealant which is to be placed in the groove. If the walls of the groove are contoured so as to confine the sealant layer in a specified manner while accommodating the thermo-viscous properties of the laminate, the completed first stage carcass may be removed without damaging the sealant layer which is adhered to the inner liner. The rotary drum is provided with fingers movable to a position to support the tire bead by means of an annular piston and cylinder surrounding the shaft of the drum and connected to the fingers by bell cranks which are pivotally mounted in the drum and operatively interconnected with means to move the fingers radially between an inactive position and a bead engaging position in response to appropriate axial movement of the drum mechanism.

12 Claims, 9 Drawing Sheets

GROOVED DRUM FOR TIRE BUILDING MACHINE

BACKGROUND OF THE INVENTION

This invention relates to apparatus for building a first stage carcass of a pneumatic tire having a 'sealant layer', interchangeably also referred to as a 'sealant strip', which makes the tire "puncture-proof". Such a tire, referred to as a "sealant tire", is disclosed in U.S. Pat. No. 4,913,209. To build a sealant tire, the sealant layer which is an elastomeric semi-solid, is placed first on a tire building drum, followed by an inner liner, carcass plies, axially spaced annular bead rings, and tread, in the usual manner of constructing a tire. More specifically, the sealant layer and inner liner must be centered upon the building drum, followed by the belt plies of essentially weftless, rubberized fabric which are assembled in the form of a cylindrical body on the drum and then bead rings are anchored into the ends of the plies. Any conventional method may be employed to attach the bead rings to the ply ends; after which the tread is centered upon the body to complete the carcass.

Since the sealant layer is typically from about 0.2 cm to about 2.0 cm thick, and narrower than the width of the inner liner, there was every reason to believe that building a first stage carcass on a conventional expansible flat drum in the conventional manner described hereinbefore, would present no serious problem if the surface of the drum and/or sealant layer was adequately coated with a suitable release coating. Clearly, if the drum was not expansible, the finished carcass would not likely be removable from the drum despite being coated with a release agent, simply because the semi-solid consistency of the sealant layer would not permit removal. No tire building machine with a non-expansible drum could be used, and specifically, the tire building machine disclosed in U.S. Pat. No. 3,489,634 (Class 156/subclass 398) to Pizzo et al cannot be used to build a sealant tire.

However, it was discovered that even a release-coated expansible drum was ill-suited to building a sealant tire carcass. Too often, the sealant layer was unacceptably distorted. In particular, the sealant strip or layer was flattened out and spread over a much wider area than that of the original layer making it impractical to maintain a desired thickness of sealant symmetrically disposed about the circumferential center line of the carcass. It was therefore deemed necessary to provide a wide groove in the surface of the drum, the groove corresponding in width and depth to the width and thickness of the sealant strip.

Since it was evident that the carcass could only be removed from the drum if it was an expansible drum, an expansible drum tire building apparatus was constructed by modifying the construction of the non-expansible drum '634 machine, including providing the drum with a groove which in side elevation presented a profile which mirrored the profile of the sealant strip. Except that, because of the physical properties of the sealant strip, and specifically its viscous semi-solid form, reminiscent of 'chewing gum', which form had to be maintained if the sealant strip was to perform its intended function, it was found that the sealant strip was routinely damaged more often than not, when the built carcass was removed (or attempted to be) from the collapsed drum.

The key to making sealant tire carcasses with an expansible drum having a groove cut in its surface symmetrically about the circumferential center line of the drum, was found to be to provide the groove with contoured opposed sidewalls. The term "contoured" is used to define sidewalls which are tapered, whether smoothly as in an inclined plane, or with interruptions such as steps; or, sidewalls which together define an arc. With such a contoured groove, any expansible drum tire building apparatus, for example those disclosed in U.S. Pat. No. 4,614,562 to Jones (class 156/subclass 420), and more recently U.S. Pat. No. 4,855,008 to Terrado (class 156/subclass 401), inter alia, may be conveniently modified for use in the building of a carcass for sealant tires.

SUMMARY OF THE INVENTION

It has been discovered that any known tire building apparatus which employs an expansible building drum may be modified for the specific purpose of building a first stage carcass of a sealant tire, if a groove in the drum's circumferential surface is provided with contoured opposed sidewalls. At least a portion of the surface of one sidewall of the groove flares outwardly at an angle $\alpha$ in the range from about 15° to 80° to the horizontal; and, at least a portion of the surface of the other sidewall is also angled at an equal angle, but oppositely directed. When the groove with contoured sidewalls is about the same width as the sealant strip, and about the same depth, at its maximum depth, as the sealant strip is thick, the completed carcass may be removed from a collapsed drum without damaging the sealant strip.

It is therefore a general object of this invention to provide an expansible central drum, tire building apparatus for building a first stage carcass for sealant tires; the drum is provided with a groove to hold the sealant strip (the drum is hence referred to as a "grooved drum"), the groove having contoured sidewalls in which at least a portion of the surface of one sidewall of the groove flares outwardly at an angle $\alpha$ in the range from about 15° to 80° to the horizontal; and at least a portion of the surface of the other sidewall is angled at an equal angle, but oppositely directed.

It is a specific object of this invention to provide an expansible central drum with a contoured circumferential groove formed by a plurality of arcuate segments; the groove permits release of a tire using bead rings having slightly larger diameters than the cylindrical plies on the drum. The bead rings are supported concentrically about the opposite end portions of the plies, and the end portions of the plies are expanded into contact with the inner peripheries of the bead rings while the central portions of the plies are also circumferentially expanded; then the end portions of the plies are folded or wrapped about the bead rings.

It is a still further object of this invention to provide a building drum assembly, including an expansible grooved central drum having radially movable elements fixedly connected to arcuate segments forming the drum, and an inflatable bladder at each of its ends, with means for moving said elements to expand the full width of plies carried on the drum assembly into contact with the inner peripheries of bead rings supported about the ply ends.

It is a specific object of this invention to provide an expansible drum with plural arcuate segments in each of which an insert is removably secured; and the insert provides the drum with a groove having the desired contoured surface.

BRIEF DESCRIPTION OF THE DRAWINGS

The foregoing and other objects and advantages of our invention will appear more fully from the following description, made in connection with the accompanying drawings of a preferred embodiment of the invention, wherein like reference characters refer to the same or similar parts throughout the several views and in which:

FIG. 17 is a side elevational view of an insert having an arcuate groove which serves as an insert's contoured surface. cl DETAILED DESCRIPTION OF PREFERRED EMBODIMENTS Briefly stated, and in accordance with one embodiment of this invention, a building drum assembly is provided comprising: a shaft; a central expansible building drum rotatably supported by the shaft; a plurality of movable elements carried within the drum to expand and collapse it, and other elements adjacent at least one of the drum's edges; annular cylinder means surrounding the shaft and fixed relative thereto; and annular piston means axially movable in the cylinder means and operatively connected to the elements to move the elements radially between an inactive position and a bead engaging piston.

Figure 1:
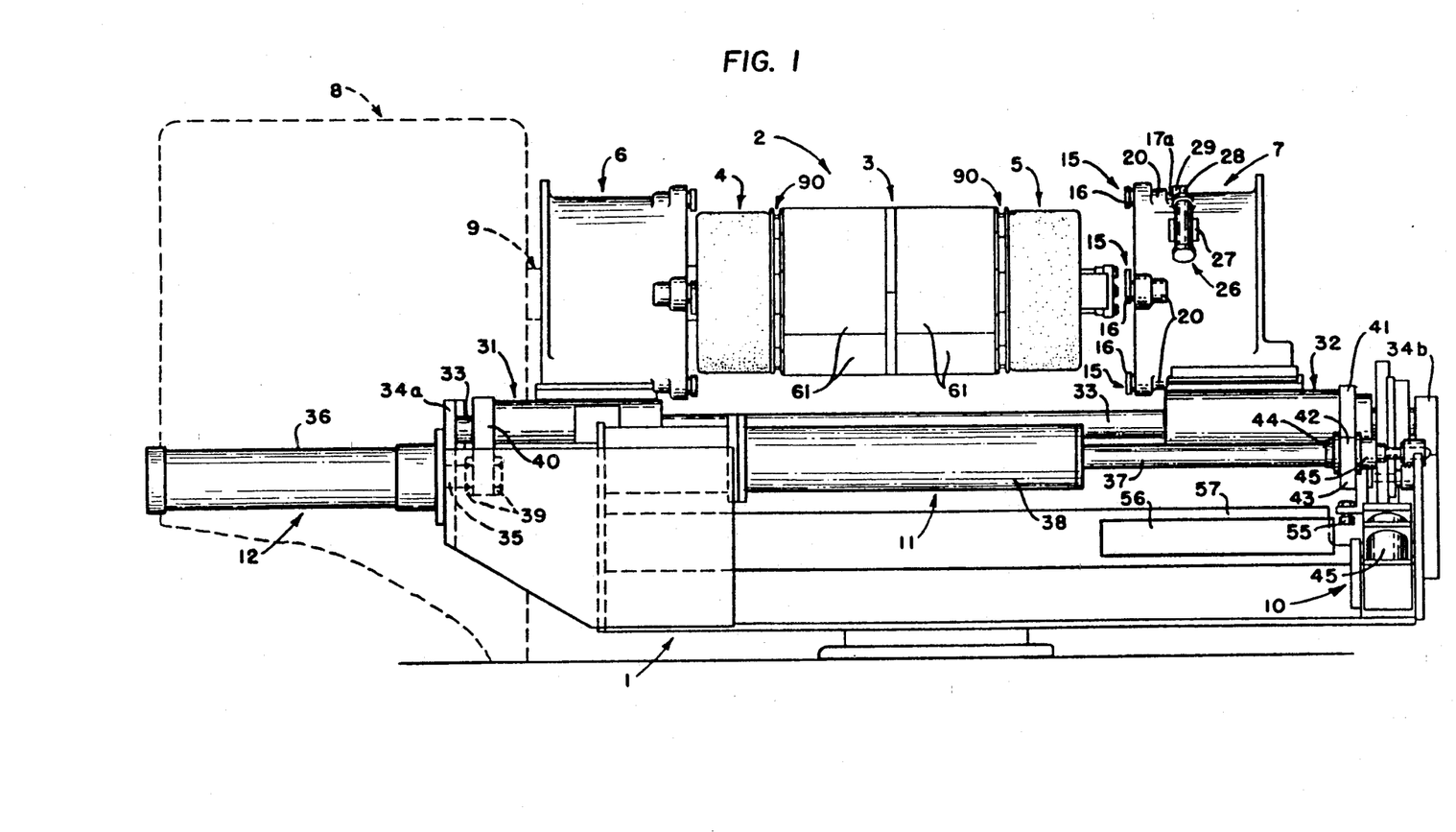
FIG. 1 is a side elevational view of a tire building apparatus embodying the present invention, portions of the apparatus being shown by means of broken lines.

Referring to FIG. 1, the building apparatus includes a frame or support, shown generally at 1, and a building drum assembly, shown generally at 2. Assembly 2 comprises a central expansible drum, shown generally at 3, an inboard auxiliary drum, shown generally at 4, and an outboard auxiliary drum, shown generally at 5. An inboard turn-over cage or member, shown generally at 6. and an outboard turn-over cage or member, shown generally at 7, are also provided. The building apparatus further includes a housing, shown generally at 8, which supports conventional drive motor means (not shown) and suitable controls (not shown) for selectively rotating the drums 3, 4 and 5. A shaft, shown generally at 9, supports building drum assembly 2 in a cantilever manner from housing 8.

Figure 2:
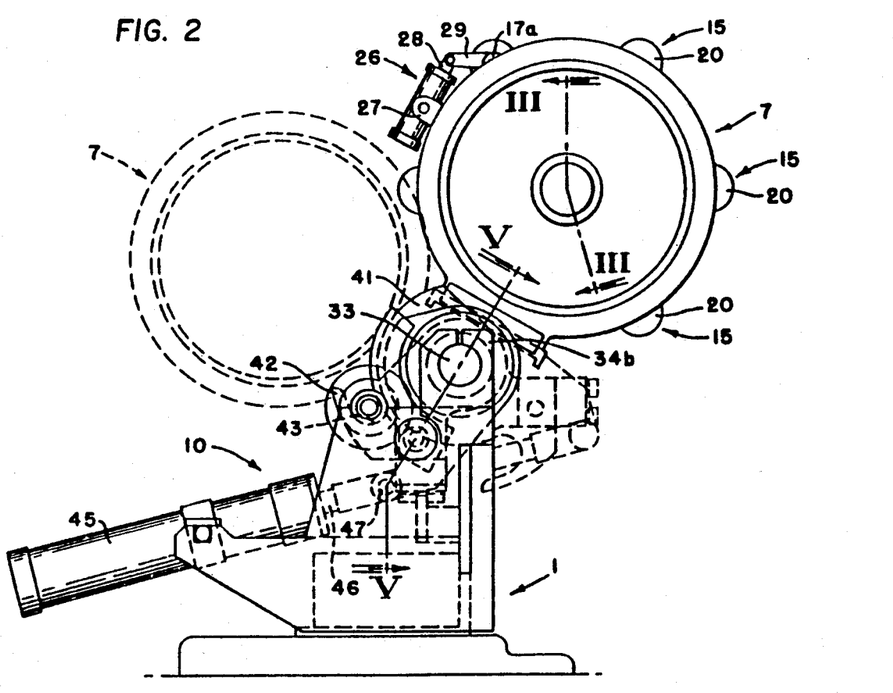
FIG. 2 is an enlarged end elevational view of the apparatus shown in FIG. 1, as viewed from the right, or outboard, end of FIG. 1.

A mechanism or means, shown generally at 10, is provided for shifting the outboard turn-over cage 7 transversely of the axis of building drum assembly 2, between the solid and broken line positions shown in FIG. 2, to permit removal of a completed tire carcass from the building drum assembly. A mechanism or means, shown generally at 11 (FIG. 1), is provided for moving outboard turn-over cage 7 axially relative to building drum assembly 2, and a similar mechanism or means, shown generally at 12, is provided for axially moving the inboard turn-over cage 6 relative to building drum assembly 2.

The turn-over cages 6 and 7 employed in the present apparatus are similar to turnover cages shown and described in U.S. Pat. No. 3,489,634 and are used herein to provide the same function they provide in the '634 patent.

Referring to FIGS. 1, 2, 7 and 8, the turn-over cages 6 and 7 are each operatively mounted on frame 1 for movement axially of building drum assembly 2. The outboard cage 7 is also adapted to be swung transversely of the axis of assembly 2 to facilitate removal of completed carcasses from drum 3. Each of the turn-over cages 6 and 7 is provided with a suitable bead ring holding means comprising a plurality of bead ring holders, each generally indicated by the numeral 15. The bead ring holders 15 are mounted rotatably in equally spaced positions about the peripheries of the turn-over cages 6 and 7.

Bead ring holders 15 are each provided with a bead ring gripping finger or member 16 (FIG. 8) which is keyed to a horizontal shaft 17. Shafts 17 are each supported rotatably by spaced apart bearings 18 and 19 mounted in housings 20 formed on the peripheries of turn-over cages 6 and 7. A pinion gear 21 is keyed to each of the shafts 17. The pinion gears 21 are adapted to mesh with a ring gear 22 which is rotatably mounted in an annular groove 23 formed in the outer surface of each of the turn-over cages 6 and 7. Retainer rings 24, held in place by screws (not shown), slidably secure ring gears 22 in their grooves 23 on the turn-over cages 6 and 7.

Figure 7:
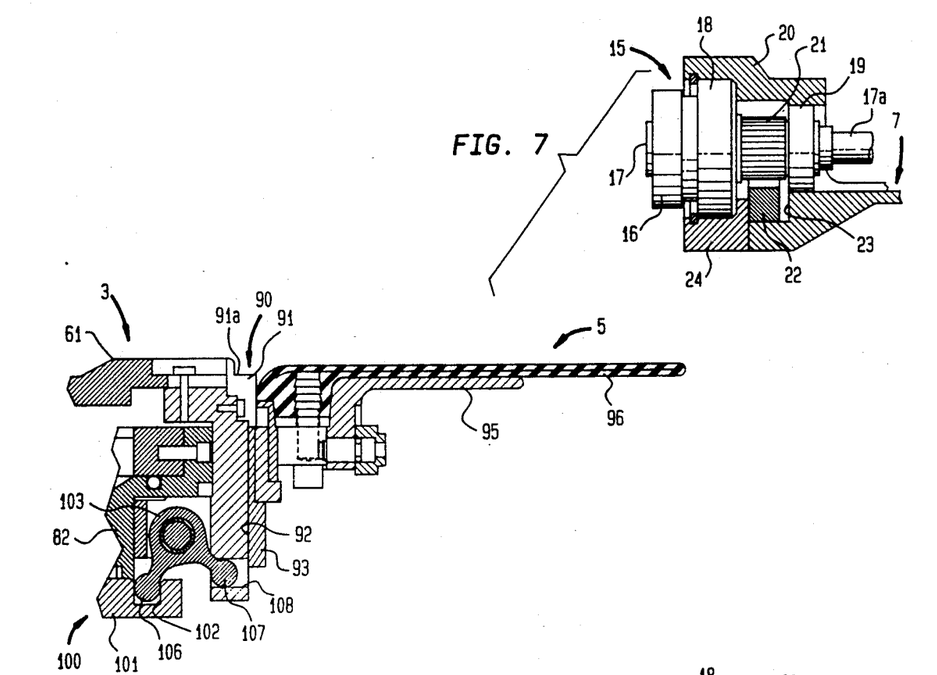
FIGS. 7-14 are enlarged, fragmentary sectional views through an edge of the building drum and a cooperating turn-over cage member, showing the apparatus in various of the configurations it assumes during fabrication of a first stage carcass of a tire.
Figure 8:
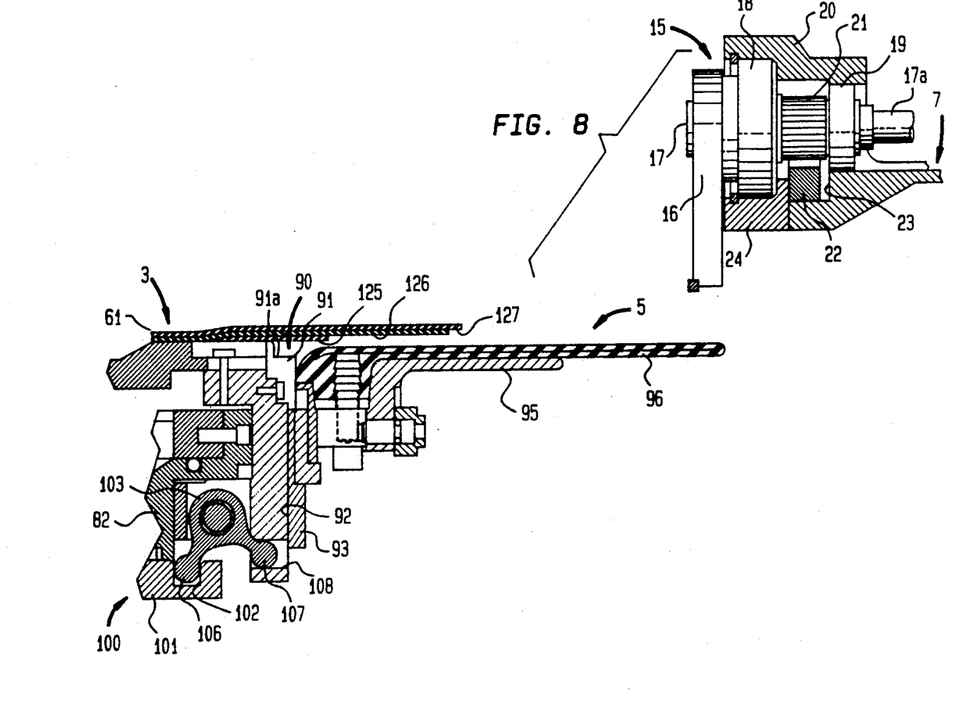

The bead ring gripping fingers 16 are shown in FIG. 8 turned to an operative position for holding a bead ring 25. As shown in FIG. 7, they are turned to a retracted or inactive position. The bead ring gripping fingers 16 of each turn-over cage are pivoted between their operative and inactive positions by means of an air cylinder 26 (FIGS. 1 and 2) on each cage. Each cylinder 26 is carried in a bracket 27 and controls the movement of a piston rod 28 between an extended and a retracted position. An arm 29 interconnects the piston rod 28 with a shaft extension 17a on one of the bead ring holders 15 of each turn-over cage. When the piston rods 28 are moved to their retracted position, the bead ring holders 15 are pivoted to their inactive positions. When the piston rods 28 are moved to their extended positions, the bead ring holders are pivoted to their operative, bead ring holding positions.

Referring to FIGS. 1, 2, 5 and 6, turn-over cages 6 and 7 are bolted to or otherwise supported from the housings of respective cage support bearings 31 and 32 (FIG. 1) which are slidable along and rotatable about shaft 33. This allows cages 6 and 7 to be axially moved relative to building drum assembly 2 and cage 7 to be transversely moved relative thereto, as will appear in greater detail hereinafter. Shaft 33 is supported at its ends by support members 34a and 34b which are fixed to frame 1. Inboard turn-over cage 6 is actuated for axial movement by the piston rod 35 of an air cylinder 36 which comprises part of the means 12 for axially moving the inboard turn-over cage relative to drum assembly 2. Outboard turn-over cage 7 is axially moved by means of the piston rod 37 of an air cylinder 39 which comprises part of the means 11 for axially moving the outboard turn-over cage relative to the drum assembly. The piston rod 35 is rigidly connected to cage support bearing 31 via nuts 39 and a flange 40 which is welded or otherwise fixed to the cage support bearing 31. Accordingly, by suitable positioning of piston rod 35 relative to cylinder 36, inboard turn-over cage 6 may be moved axially relative to drum assembly 2 and stopped at selected positions therealong. Suitable limit switches, stops add electrical control circuits (not shown) may be provided to facilitate the moving and selective positioning of turnover cages 6 and 7 relative to drum assembly 2 in accordance with known practices.

In order to facilitate transverse movement of the outboard turn-over cage 7 by shifting means 10, the connection between piston rod 37 and cage support bearing 32 is made separable. This has been illustrated in FIGS. 1, 2, 5 and 6. A flange 41 is welded to the outer periphery of cage support bearing 32. Flange 41 is provided with a hook 42 (FIG. 6), the bottom portion 43 of which is adapted to engage and stop against piston rod 37. Suitable collars 44 and 45 (FIG. 1) carried by piston rod 37 engage opposite sides of flange 41 adjacent hook 42 when the cage is in axial alignment with the building drum assembly 2. This ensures that when turn-over cage 7 is in alignment with drum assembly 2, the turn-over cage will move axially of the drum assembly upon retraction and extension of piston rod 37 relative to cylinder 38. When turn-over cage 7 is shifted transversely of drum assembly 2 under the influence of shifting means 10, the cage rotates about its support shaft 33, disengaging hook 42 and flange 41 from piston rod 37. This precludes inadvertent axial movement of cage 7 during the time it is out of axial alignment with drum assembly 2.

The manner in which shifting means 10 swings cage 7 transversely of drum assembly 2 will now be considered in greater detail. Shifting means 10 (FIG. 2) comprises an air cylinder 45 which drives a piston rod 46 between extended and retracted positions. Piston rod 46 (FIG. 5) is pivotally connected at 47 to one end of a lever 48. The opposite end 49 of lever 48 is journaled on a bearing 50 which is carried by the cage support shaft 33.

Figure 5:
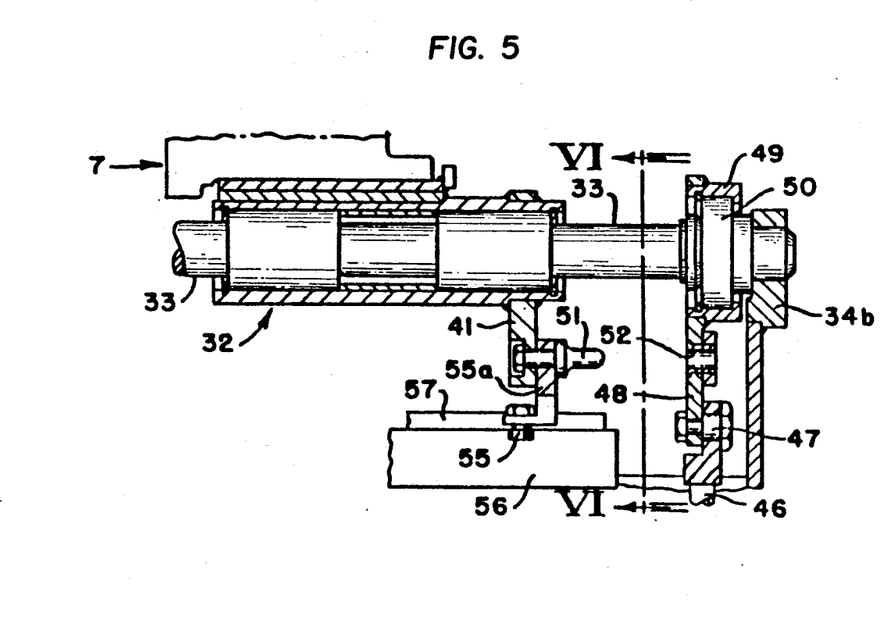
FIG. 5 is a fragmentary sectional view, taken on the line V—V of FIG. 2.
Figure 6:
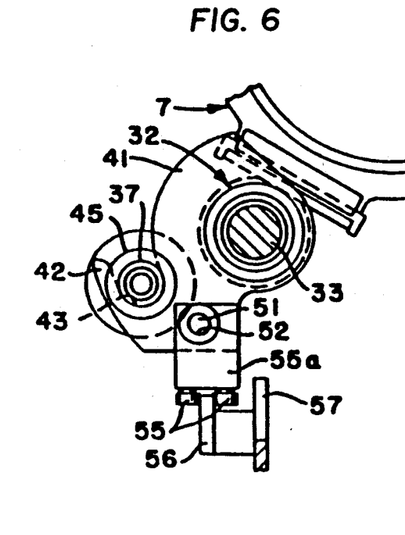
FIG. 6 is a fragmentary sectional view taken on the line VI—VI of FIG. 5.

Referring to FIG. 5, which shows the outboard cage 7 moving to the right and nearing, but not at, its extreme outboard position, the flange 41 carried by cage support bearing 32 is provided with a pin 51 affixed thereto. Pin 51 projects from flange 41 into engagement with an aperture 52 in the lever 48 when cage 7 is at its extreme outboard position as a result of piston rod 37 (FIG. 1) being fully extended from cylinder 38. Pin 51 and aperture 52 cooperate to couple flange 41 to lever 48 so that upon extension and retraction of piston rod 46 (FIG. 2) relative to power cylinder 45, cage 7 will move transversely of drum assembly 2.

The pin 51 and aperture 52 arrangement which couples shifting means 10 to cage 7 (FIG. 5) allows the cage to be moved axially of assembly 2 by axial moving means 11, as indicated earlier. In order to avoid rotation of cage support bearing 32 about shaft 33 during such axial movement, flange 41 is provided with downwardly extending guide rollers 5 which cooperate with a guide rail 56 during axial movement of the cage 7 (see FIG. 6). Rollers 55 are carried by a bracket 55a that is fixed to flange 41. Guide rail 56 is supported by a bracket 57 that is fastened to the frame 1 of the building apparatus.

Referring to FIG. 1, which shows the cage 7 at its extreme outboard position (when piston rod 37 is fully extended from cylinder 38), it will be seen that at this position guide rollers 55 are clear of guide rail 56 to thus facilitate transverse shifting of the cage.

Figure 3:
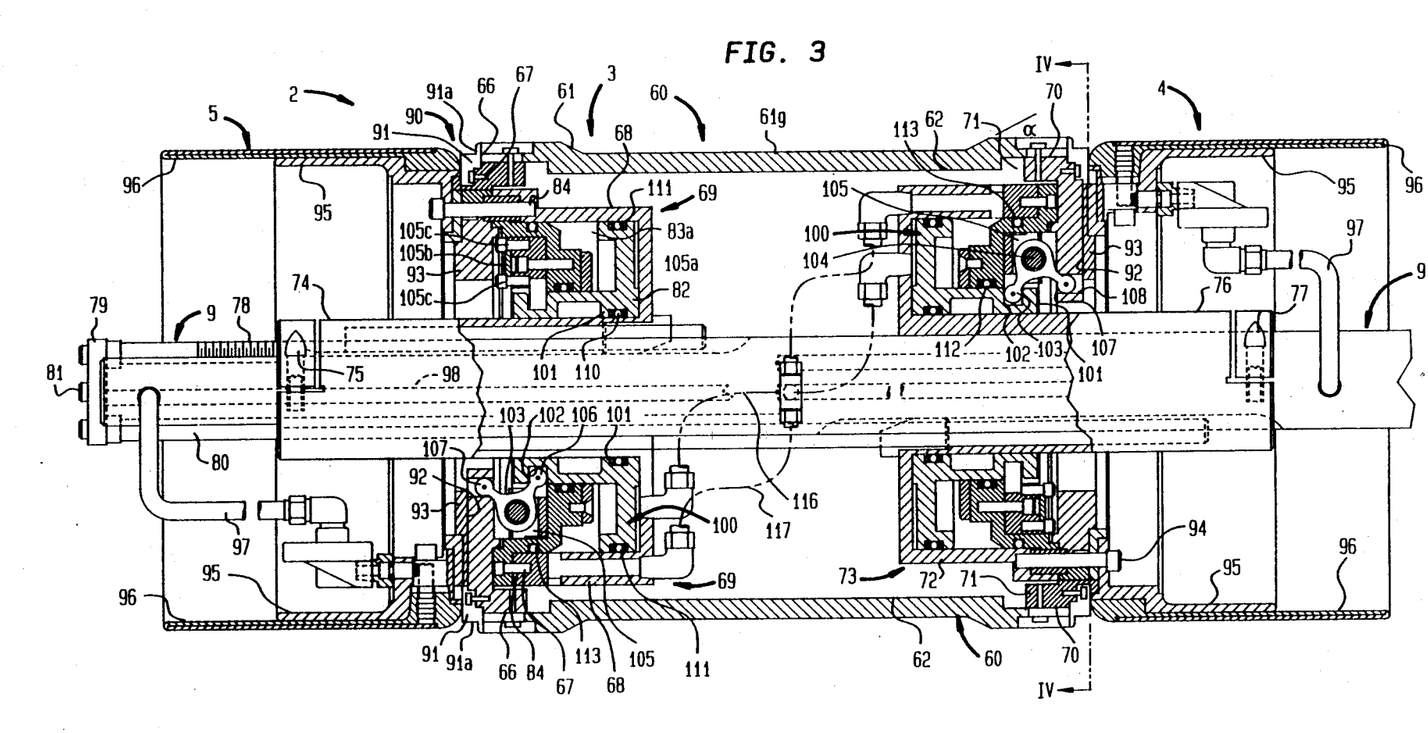
FIG. 3 is an enlarged sectional view, taken on line III—Ill of FIG. 2, of the building drum assembly of the apparatus.
Figure 4:
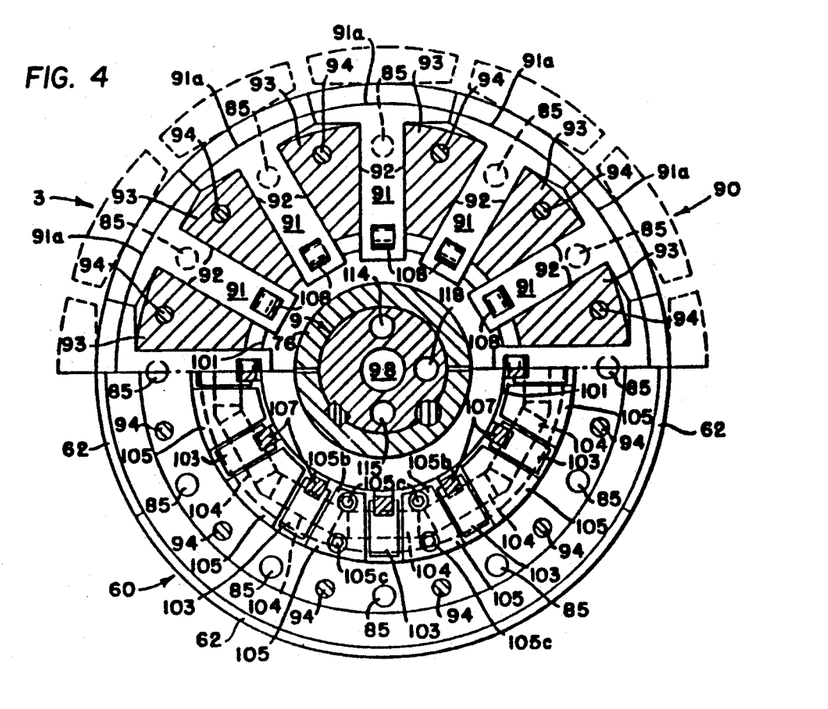
FIG. 4 is an enlarged transverse sectional view, taken on line IV—IV of FIG. 3, showing the radially movable elements at their inactive positions in solid lines and at their bead engaging positions in broken lines.

Referring now to FIGS. 3 and 4, the building drum assembly 2 will now be considered in greater detail. As indicated earlier, drum assembly 2 comprises a central, expansible drum 3, an inboard auxiliary drum 4, and an outboard auxiliary drum 5. The central drum 3 is provided with an outer working surface 60 which is formed by a plurality of arcuate segments 61 fixedly connected to a radially movable drum expanding means indicated generally by reference numeral 90.

Each of the segments 61 is a grooved arcuate segment, which together, in side-by-side relationship, provide the expansible cylindrical drum. When the drum is collapsed, the segments are in contiguous side-by-side relationship forming an uninterrupted cylindrical surface; and, when the drum is expanded, the segments are in side-by-side circuferentially spaced apart relationship. There are twelve (12) segments which together encompass 360° of the circumferential drum surface 60. The segments 61 are fastened, as by bolts 63, to the drum expanding means 90. The housing 68 of an annular cylinder, shown generally at 69, and a similar structure, comprising housing 72 and annular cylinder 73 serves to support the arcuate segments 61.

Figure 15:
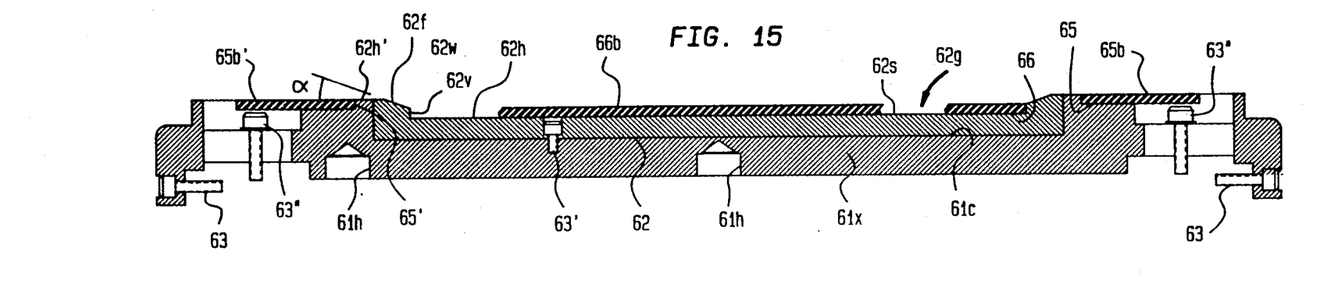
FIG. 15 is a partial end elevational view of a segment of the expansible drum, in which segment an insert with tapered sidewalls is removably secured.
Figure 16:
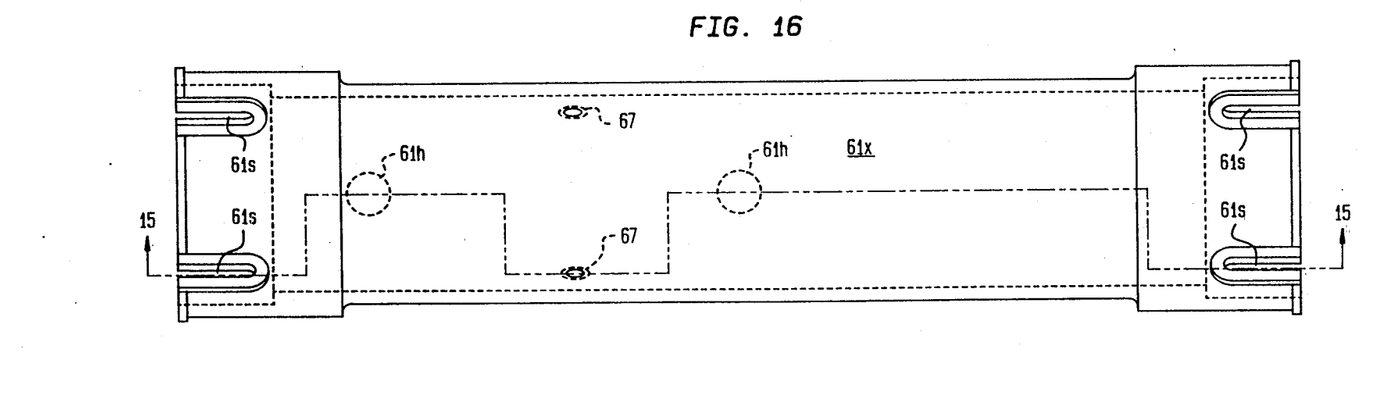
FIG. 16 is a plan view of a segment showing the central channel in which the insert is to be removably secured.

Each segment 61, bolted to finger 91 with bolt 63", has a groove 61g symmetrical about the central vertical circumferential axis of the drum, and the walls 61w flare outwardly at an angle $\alpha$ in the range from about 15 to about 80 degrees to the horizontal. The side elevational profile of the walls together with the bed of the groove 61g, supports and at the same time confines the elastomeric sealant layer (not shown) which is to be built into the carcass of the tire. It is more preferred, as shown in FIG. 15, to provide a channel 61c cut into each segment 61x, symmetrically about the central vertical circumferential axis, to snugly accommodate an insert 62 which is removably secured therein. As shown in FIG. 16 which is a plan view of segment 61x, referencing holes 61h are provided for machining the segment, and slots 61s allow positioning each segment precisely before bolts 63 are tightened. Each insert 62 is bolted to each of the twelve segments with a bolt 63' (FIG. 15) inserted in through-passages 67'.

The upper surface 62s of insert 62 is contoured to provide a groove 62g symmetrical about the vertical circumferential axis, the walls 62w of which groove flare outwardly at the angle $\alpha$, and as before, the side elevational profile of the walls together with the bed of the groove 62g, supports and confines the elastomeric sealant layer which is to be place in the groove. The specific manner in which the insert 62 is removably fastened in the segment 61x is not critical, provided it is accurately positioned. Greater accuracy may be obtained if each insert is keyed to the segment before it is bolted (not shown).

The removable insert makes it possible to change inserts without having to disassemble the segments of the drum should one wish to vary the contour of the walls of the insert for different thicknesses of sealants, or for different sealant materials which may have different tendencies to flow under the forces generated during construction of a first stage carcass.

It is most preferred to provide shallow troughs 65, 65' in which rubber belts 65b and 65b' respectively are fitted to cover the slotted ends of the segments; and a shallow trough 66 in which a rubber belt 66b is fitted to cover the passages for the bolts 63' and 63". If left uncovered, sealant is likely to be pressed into the slots and passages.

To permit the use of such belts, as illustrated in FIG. 15 with portions of the belt 66b broken away to show the details, each sidewall 62w has an initial vertical step 62v which defines the boundary of the trough 66 which is provided to confine and locate a rubber belt 66b. The belt 66b provides the bed of the groove 62g with a smooth surface. The outwardly flared portion 62f of the wall 62w is inclined at 20° (say) and connected at its lower and upper ends to first and second horizontal portions 62h and 62h' respectively. The second horizontal portion 62h' is provided mainly to avoid leaving a sharp edge at the top of the sidewall. Throughpassages 67, recessed at the upper surface 62s of the insert are provided for bolts 63' to bolt each insert 62 to each segment 61x.

Figure 17:
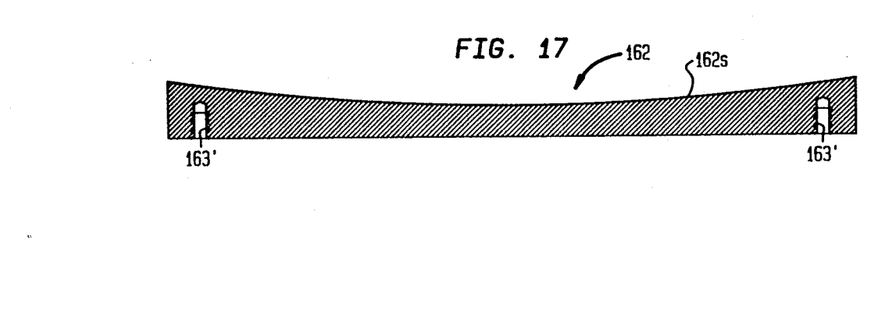

Another embodiment of an insert with contoured walls is schematically illustrated in FIG. 17. The insert 162 is provided with an upper surface 162s which is a continuous arc. The radius of the arc is chosed so that the depth of the groove, measured from the chord to the lowest point of the arc, preferably ranges from about 1 cm (0.375 inch) to about 1.6 cm (0.625 inch), depending upon the size of the tire and the thickness of the sealant layer to be used. The insert is provided with bored and tapped holes 163' into which bolts (not shown) pass through the underlying segment and are threadedly secured in the insert.

After each of the steps required to build a carcass of a sealant tire on the drum's surface 60 is completed, the drum is collapsed and the profile of the groove in the insert allows the sealant to be released without substantially altering the profile of the sealant. Covering belts 67 are provided at each end of the segments to cover openings between the segments.

Annular cylinder 69 is provided with an inner, split hub member 74 which is clamped to shaft 9 by means of bolts 75. Similarly, annular cylinder 73 is provided with an inner, split hub member 76 which is clamped to shaft 9 by means of bolts 77. An elongated adjustment screw 78, having one end rotatably supported in a bracket 79 and the other end in threaded engagement with hub member 74, is employed to axially position the hub member relative to shaft 9. A similar elongated adjustment screw 80, which also has one end rotatably supported in bracket 79 and the other end in threaded engagement with hub member 76, is employed in connection with axially moving hub member 76 relative to shaft 9. The bracket 79 is fixed to the end of shaft 9 by means of a bolt 81. The annular cylinders 69 and 73 are further provided with respective cylinder heads 82 and 83 which are bolted in place by bolts 84 and 85, respectively.

The longitudinal positioning of cylinders 69 and 73, accomplished by adjustment screws 78 and 80, allows the size of the central drum to be changed (by substituting different size segments in the groups of segments 61), to facilitate building tires of different sizes. It will be apparent, of course, that the bolts 75 and 77 must be loosened prior to changing the axial positions of the hubs 74 and 76 on shaft 9.

The structures associated with annular cylinder 69 and outboard auxiliary drum 5 are essentially similar to the structures associated with annular cylinder 73 and inboard auxiliary drum 4. Accordingly, this discussion will proceed with a description of the structures associated with annular cylinder 73 and the auxiliary drum 4, it being understood, however, that the description also applies to annular cylinder 69 and auxiliary drum 5.

The drum expanding means 90, is provided at each end of the central drum 3, and these opposed means 90 are interconnected by the grooved segments 61 for expanding the full width of the plies carried on the drum into contact with the inner peripheries of bead rings positioned about but radially spaced from the end portions of the plies. Referring to FIG. 4, the expanding assembly of finger means 90 and segments 61 includes a plurality of T-shaped elements or fingers 91 which are movable between the inner or radially retracted, inactive position shown in solid lines in FIG. 4, and the outer or radially extended, bead engaging position shown by broken lines in this figure. The radially outer portions of fingers 91 are thickened and provided with a threaded bore 63' into which a bolt 63 is threadedly secured so that the projecting end 64 of the finger and the surface of the segment 61 are coplanar. Each finger is arcuate in shape circumferentially corresponding to that of drum 3, and provided with a circumferentially extending bead receiving shoulder 91a (FIG. 3) formed therein, the cumulative circumferential length of the outer portions of fingers 91 being less than that of the circumference of drum 3 because of the thickness of the segment at its end where it is bolted to the finger.

Fingers 91 are radially movable in channels 92 formed at circumferentially spaced locations about a backup plate 93. The backup plate 93 is held in place by means of bolts 94 which threadedly engage the housing 68 of annular cylinder 69. Bolts 94 also serve to fasten a cylindrical support or shell 95 to the central drum 3, the shell 95 in turn supporting an inflatable bladder 96. A suitable conduit 97, which communicates with a duct 98 formed internally of the shaft 9, is employed to conduct air under pressure to and release compressed air from the bladder 96 in connection with folding the ply ends over the bead rings, as will appear hereinafter in greater detail.

The fingers 91 are moved between their radially inner, inactive position and their radially outer, bead engaging position by means of an annular piston 100 (FIG. 3) that is axially movable in annular cylinder 73. Piston 100 is provided with an annular piston rod 101 having a circumferential groove 102 formed therein. A plurality of bell cranks 103 are pivotally mounted about the hub 76 on respective pins 104, there being one bell crank 103 and one pin 104 for each finger 91. The pins 104 are supported by wedge shaped members 105 (FIG. 4), and the entire sub-assembly of bell cranks 103, pins 104 and wedges 105 is supported between the outward face of cylinder head 83 and the inward face of backup plate 93 (FIG. 3), there being a lip and groove structure 83a to ensure correct placement of parts. Two of the wedges 105 are made of split construction including two halves 105a and 105b which are fastened together by bolts 105c (see FIG. 4). This arrangement facilitates the installation of the sub-assembly into its position in drum 3. As will be seen, the unitary grooved arcuate segments 61 which connect the opposed finger means 90 ensures that the drum surface 60 is level at all times.

The bell cranks 103 interconnect annular piston rod 101 with fingers 91 and serve as motion converting means to convert the axial movement of piston rod 101 into the radial movement of fingers 91. The bell cranks 103 are each provided with a first arm 106 in engagement with the groove 102 of piston rod 101. A second arm 107 on each bell crank 103 is in engagement with a respective slot 109 formed in each of the fingers 91. Accordingly, when piston 100 is shifted axially in cylinder 69, bell cranks 103 pivot about their pins 104 and force the fingers 91 to move radially in their slots 92.

Inner and outer O-rings 110 and 111, respectively (FIG. 3), are carried by the annular piston 100 to seal the inner and outer surfaces of piston 100 relative to annular cylinder 73. Similar inner and outer O-rings 112 and 113, respectively, are carried by the cylinder head 83 to seal the cylinder head relative to the annular piston rod 101 and the annular cylinder 73.

In order to move the annular pistons 100 axially of the annular cylinders 69 and 73, compressed air is led to and evacuated from opposite ends of annular cylinders 69 and 73 via ducts 114 and 115 in shaft 9 and via respective conduits 116 and 117, there being suitable pneumatic and electric circuits (not shown) provided for controlling such air flow. From the foregoing, it will be seen that when conduit 116 is pressurized and conduit 117 is connected to atmosphere, the piston 100 will move axially outwardly of the central drum 3 (away from each other), causing fingers 91 to move from their inactive positions to their bead engaging positions while simultaneously expanding the drum. Conversely, when conduit 116 is connected to atmosphere and conduit 117 is pressurized, the annular pistons 100 will both move axially inwardly of central drum 3 (toward one another), causing the fingers 91 to be moved from their bead engaging positions to their inactive positions while simultaneously collapsing the drum.

In order to provide a means for breaking the adhesion between the sealant layer (not shown) on drum 3 and the surface 60 thereof, a compressed air supply duct 118 is provided internally of shaft 9. This duct communicates with a conduit 119 having branches 120 and 121 which lead to the surface 60 of the central drum 3. When compressed air is lead through duct 118 and conduits 119, 120 and 121, the compressed air is discharged into the space between surface 60 and the surrounding sealant layer, causing partial inflation of the body and a breaking of the adhesion between the body and the drum.

The operation of the apparatus described herein will now be considered in connection with the manufacture of a sealant tire. At the start of a tire building operation, the apparatus is in the condition shown in FIGS. 1, 2 and 7, in which the bead ring holding means 15 are in their retracted positions, the drum expanding means 90 are retracted, the cages 6 and 7 are outward of the drums 2, 3 and 4, and cage 7 is in axial alignment with assembly 2. The first steps in the tire building operation involve rotating the bead ring holding means 15 from the position shown in FIG. 7 to the position shown in FIG. 8 and positioning bead rings 25 in contact with each set of bead ring gripping fingers 16. As indicated earlier, the rotation of fingers 16 to the position shown in FIG. 8 is accomplished by extending the piston rod 28 (FIG. 1) from its air cylinder 26.

Figure 9:
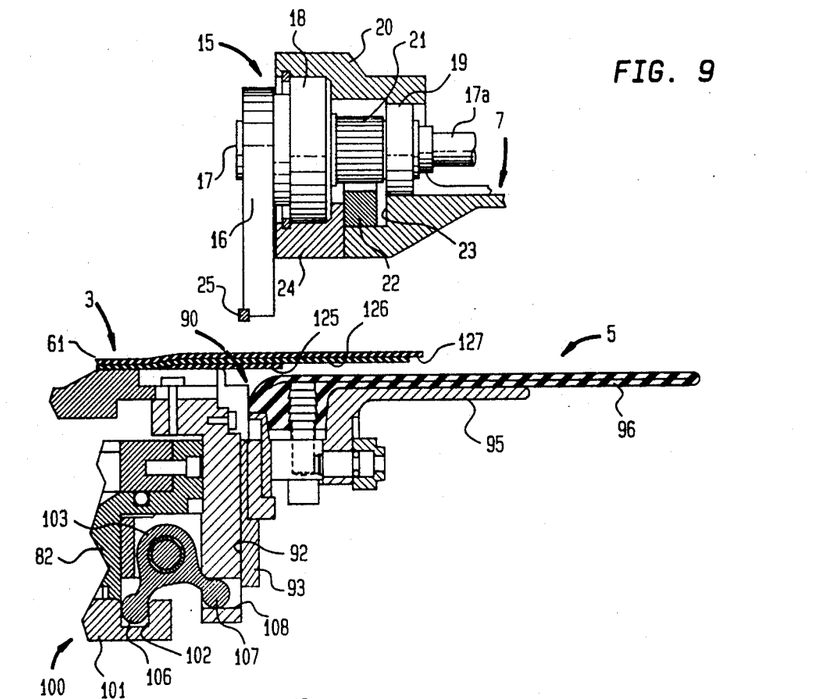
Figure 10:
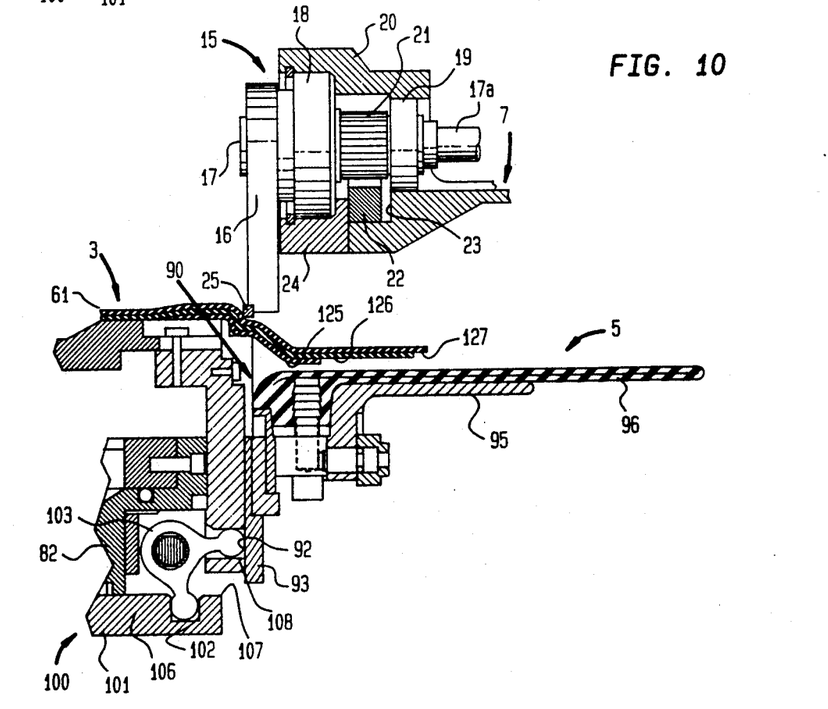
Figure 11:
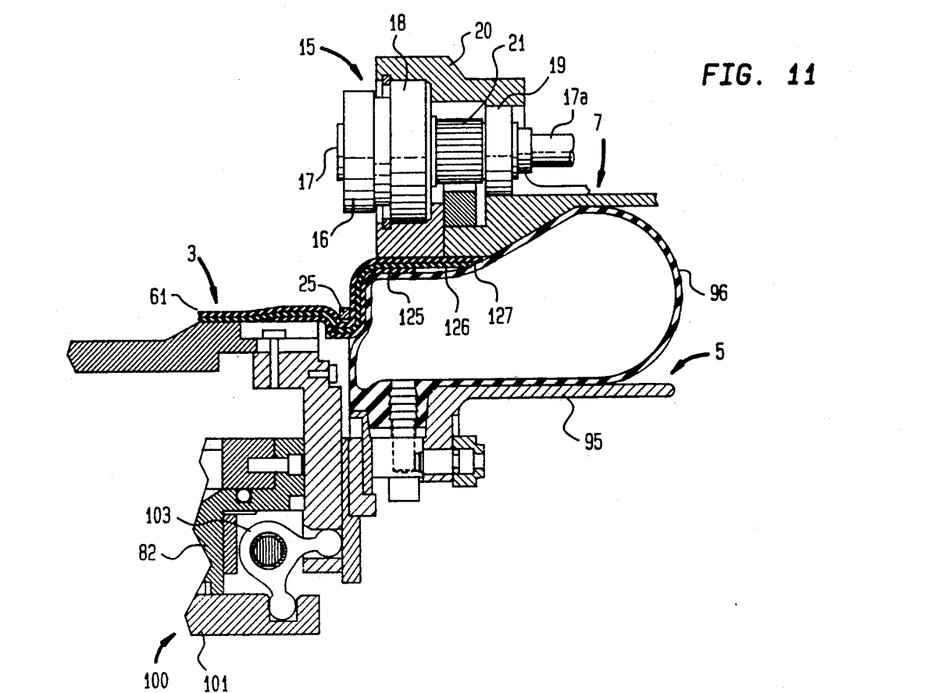

At this point toe strips 125 (FIG. 8) are wound about each end of central drum 3 and then the sealant layer and inner liner (preferably pre-formed as a unitary strip with the sealant layer being profusely dusted with zinc stearate or other release agent) are placed on the drum, also coated with a release agent to facilitate removal of the sealant tire, so the sealant layer is snugly held in the groove. Then first and second plies 126 and 127 are applied to the central drum, in accordance with usual practices. Thereafter, referring to FIG. 1, the means 11 and 12 for axially moving the outboard and inboard cages 7 and 6, respectively, are actuated to position the bead rings 25 in radial alignment with the radially movable fingers 91, as shown in FIG. 9. The annular cylinders 69 and 73 are then activated to cause the annular pistons 106 to move axially outwardly, causing the fingers 91 to move radially outwardly. Accordingly, the end portions of the plies are moved into engagement with the inner peripheries of the bead rings 25, as shown in FIG. 10. At this time bead rings 25 are locked into position relative to plies 126 and 127. The air cylinders 26 (FIG. 1) are now actuated to retract piston rods 28, thereby rotating all of the bead ring holding means 15 to their inactive positions, as shown in FIG. 11. Concurrently with this operation, the bladders are inflated to cause further adhering of the plies 126 and 127 to the bead rings 25, as shown in FIG. 11.

Figure 12:
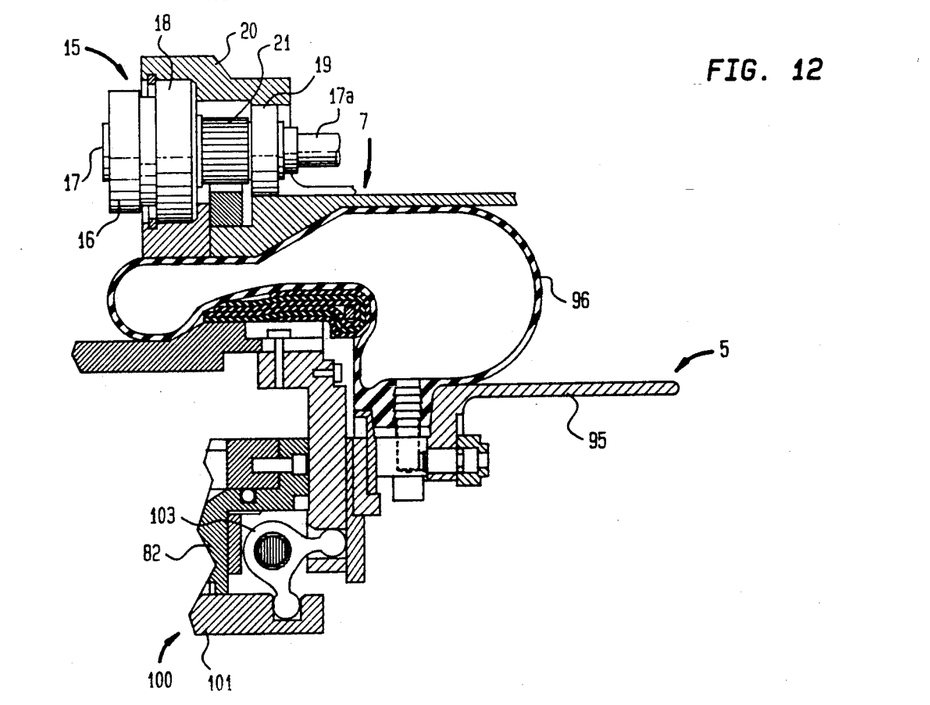
Figure 13:
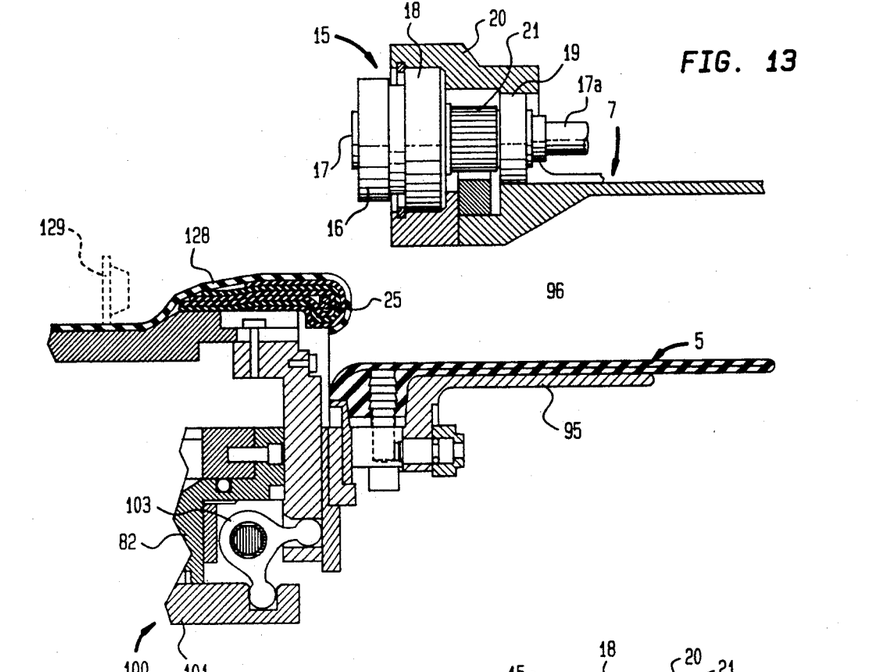

When the bead ring holding means 15 has been retracted to their inactive positions, the drum is expanded, and the bladders 96 have been fully inflated, the cage moving means 11 and 12 are again actuated to move cages 6 and 7 farther toward one another, to the positions shown in FIG. 12. As a result, the end portions of the plies 126 and 127 are turned inwardly over the bead rings and adhered to the portions of the plies located inwardly of the bead rings, as shown in FIG. 12. When this operation has been completed, bladders 96 are deflated and, concurrently therewith, the cages 6 and 7 are moved from their inboard positions toward their outboard positions, as shown in FIG. 13. At this point a tread and sidewall slab 128 is applied atop the folded over plies 126 and 127, and the entire assembly is then stitched together by a stitching wheel, shown generally at 129 in FIG. 13. The raw tire is now completed and the fingers 91, which have been supporting the bead rings in accurate axial relationship with the remainder of the tire components during the entire fabrication of the tire, can now be retracted.

Figure 14:
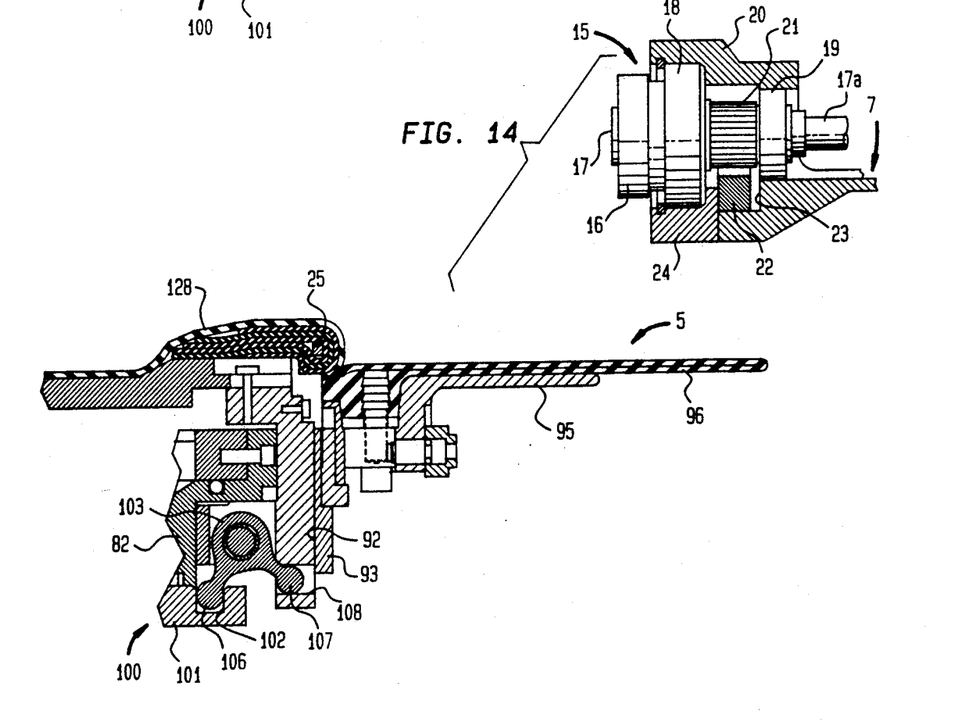

Accordingly, fingers 91 are retracted to their inactive position, as shown in FIG. 14, and release air is applied through duct 118 (FIG. 3) and conduits 119, 120 and 121 to the space between the carcass and the central drum 3 to break the adhesion therebetween. Concurrently with this, the means 10 for transversely moving the outboard cage 7 relative to the drum assembly 2 is actuated and the outboard cage moves from the solid line position shown in FIG. 2 to the dotted line position shown in that figure. At this point the operator can grasp the beaded end of the carcass and pull the completed carcass off of the drum assembly 2. When this has been done, the means 10 for moving the outboard cage transversely of the assembly is again actuated to move the cage back into alignment with the building drum assembly 2. The tire building apparatus is now in the same condition as it was when the tire building operation started (FIG. 7) and it is ready to be employed in the building of another tire.

From the foregoing, it will be seen that this invention provides an improved apparatus for building tires, air springs and other laminates by known methods. The annular cylinder annular piston-bell crank mechanism utilized herein to move the fingers 91 between their inner, inactive positions and their outer, bead engaging positions, represents a compact, positive-acting mechanism of high accuracy and reliability. Its utilization in conjunction with a tire building apparatus enables tires to be built rapidly and with great uniformity on the apparatus.

While a particular embodiment of this invention has been shown and described, it will be obvious to those skilled in the art that various changes and modifications may be made without departing from this invention in its broader aspects, and it is, therefore, aimed to cover all such changes and modifications as fall within the spirit and scope of this invention.

We claim:

1. A building drum assembly for building a first stage carcass of a sealant tire having a sealant strip adhesively secured to the inner surface of the liner of said carcass, said assembly comprising a shaft; a central building drum rotatably supported by said shaft; means exterior to the central building drum to turn over edges of the carcass; a plurality of movable fingers carried by said central drum adjacent each of its edges, said fingers being interconnected to lateral, grooved segments which together in side-by-side relationship provide an expansible cylindrical drum surface, said fingers being rotatable with said central drum; each said grooved segment having a single groove symmetrically disposed relative to the circumferential center plane of said central drum, said groove being adapted to provide an upper surface having contoured sidewalls in which at least a portion of the surface of each sidewall flares outwardly at an angle α in the range from about 15° to 80° to the horizontal, to accommodate a sealant strip of sufficient width; annular cylinder means surrounding said shaft and fixed relative thereto; annular piston means positioned in said cylinder means and axially movable therein relative to one another; and motion converting means connecting said piston means and said fingers to move said fingers and associated grooved segments radially between a retracted, inactive position and an extended, bead supporting position in response to axial movement of said piston means.

2. The building drum assembly of claim 1 wherein said motion converting means comprises bell crank means pivotally mounted in said piston means; and the depth of said groove, measured at its deepest point, is about the same as said sealant strip is thick.

3. The building drum assembly of claim 2 wherein said groove in said segment is arcuate in elevational profile and formed by a very large number of circumferential increments flaring outwardly at an angle in said range.

4. The building drum assembly of claim 2 wherein each of said fingers comprises a thickened end portion and a projecting end terminating coplanarly with the drum's surface; and, each of said fingers comprises a radially outer portion which is arcuate in shape resembling the circumference of said drum and is provided with a circumferentially extending bead receiving shoulder.

5. A building drum assembly for building a first stage carcass of a sealant tire having a sealant strip adhesively secured to the inner surface of the liner of said carcass, said assembly comprising a shaft; a central building drum rotatably supported by said shaft; means exterior to the central building drum to turn over edges of the carcass; a plurality of movable fingers carried by said central drum adjacent each of its edges, said fingers being interconnected to lateral, plural segments which together in side-by-side relationship provide an expansible cylindrical drum surface, said fingers being rotatable with said central drum; an insert removably secured in each said segment which is adapted to receive said insert in the upper surface of said segment; said insert having an upper surface with a single arcuately tapered groove to accommodate a sealant strip of sufficient width therein symmetrically disposed relative to the circumferential center plane of said central drum; annular cylinder means surrounding said shaft and fixed relative thereto; annular piston means positioned in said cylinder means and axially movable therein relative to one another; and motion converting means connecting said piston means and said fingers to move said fingers and associated grooved segments radially between a retracted, inactive position and an extended, bead supporting position in response to axial movement of said piston means.

6. The building drum assembly of claim 5 wherein said insert is provided with a groove having contoured opposed sidewalls in which at least one portion of a surface of a sidewall flares outwardly at an angle α in the range from about 15° to 80° to the horizontal, with at least a portion of a surface of the other sidewall being angled at an equal angle, but oppositely directed.

7. The building drum assembly of claim 5 wherein said insert is provided with a groove in its upper surface which presents an end elevational profile which is arcuate, the radius of the arc being chosen as a function of the diameter of the carcass to be built and the thickness of said sealant layer.

8. In a tire building machine having an expansible building drum with a circumferentially discontinuous cylindrical shell formed by the upper surfaces of each of a series of closely spaced axially elongated rigid segments rotatably mounted on a shaft for radial movement of said surfaces, actuating means for causing such radial movement of said surfaces by movement of said segments in unison, bead setting means to move a wire bead ring against the carcass ply material at the ends of the drum, and automatic turn-up means exteriorly disposed to turn the outer portions of the tire's carcass material up over the bead rings and to press said portions against the carcass material, the improvement comprising, each said segment having a single groove symmetrically disposed relative to the circumferential center plane of said central drum, said groove having tapered sidewalls in which at least a portion of the surface of each sidewall flares outwardly at an angle α in the range from about 15° to 80° to the horizontal, to accommodate a sealant strip of sufficient width.

9. The building drum assembly of claim 8 wherein said groove in said segment is arcuate in elevational profile and formed by a very large number of circumferential increments flaring outwardly at an angle in said range.

10. In a tire building machine having an expansible building drum with a circumferentially discontinuous cylindrical shell formed by the upper surfaces of each of a series of closely spaced axially elongated rigid segments rotatably mounted on a shaft for radial movement of said surfaces, actuating means for causing such radial movement of said surfaces by movement of said segments in unison, bead setting means to move a wire bead ring against the carcass ply material at the ends of the drum, and automatic turn-up means exteriorly disposed to turn the outer portions of the tire's carcass material up over the bead rings and to press said portions against the carcass material, the improvement comprising, each said segment having a single groove symmetrically disposed relative to the circumferential center plane of said drum; an insert removably secured in said groove, said insert having a single groove with tapered sidewalls angled at an angle $\alpha$ in the range from about 15° to 80° to the horizontal, to accommodate a sealant strip of sufficient width.

11. The building drum assembly of claim 10 wherein said insert is provided with a groove in the insert's upper surface, said insert's groove having a surface with contoured opposed sidewalls in which at least one portion of a surface of said sidewall flares outwardly at an angle in said range.

12. The building drum assembly of claim 10 wherein said insert is provided with a groove in its upper surface which presents an end elevational profile which is arcuate, the radius of the arc being chosen as a function of the diameter of the carcass to be built and the thickness of said sealant layer.

* * * * *